United States Patent
Buisson

[15] 3,668,154
[45] June 6, 1972

[54] PHOSPHORUS-CONTAINING POLYOLS AND POLYURETHANES EMBODYING SAME

[72] Inventor: Michel A. Buisson, Lavera, France
[73] Assignee: Naphtachimie, Paris, France
[22] Filed: June 3, 1970
[21] Appl. No.: 43,218

[30] Foreign Application Priority Data

June 4, 1969 France..................................6918298

[52] U.S. Cl. ....................260/2.5 AR, 252/182, 260/2.5 BB, 260/77.5 AR, 260/984
[51] Int. Cl. ....................................C08g 22/14, C08g 22/46
[58] Field of Search ................260/2.5 BB, 2.5 AR, 77.5 AR, 260/984

[56] References Cited

FOREIGN PATENTS OR APPLICATIONS 1,504,727 12/1967 France..............................260/2.5 BB Primary Examiner—Donald E. Czaja
Assistant Examiner—H. S. Cockeram
Attorney—McDougall, Hersh & Scott

[57] ABSTRACT

This invention is addressed to phosphorus-containing polyols prepared by reacting a chloro-chloro-alkyl phosphate having an average of 0.5 to 2.5 chlorine atoms joined directly to a phosphorus atom with a primary or secondary amine having at least one function which is capable of reacting with an organic isocyanate in the presence of water and a hydrogen chloride acceptor whose reaction product with HCl is soluble in water, and to flame or fire resistant polyurethanes prepared by reaction of a phosphorus-containing polyol and an organic polyisocyanate.

16 Claims, No Drawings

PHOSPHORUS-CONTAINING POLYOLS AND POLYURETHANES EMBODYING SAME

This invention relates to improved phosphorus-containing compositions which can be used to prepare flame or fire-resistant polyurethanes, and to polyurethane premixtures and foams prepared therefrom.

In copending application Ser. No. 672,430, filed Oct. 3, 1967, and entitled, "Phosphorus-Containing Non-Inflammable Polyurethanes," description is made of polyurethanes which are resistant to fire or flame which are prepared by reacting phosphorus-containing polyols, either alone or in admixture with organic polyhydroxylated compounds which do not contain phosphorus with polyisocyanates. The phosphorus-containing polyols used in the preparation of these polyurethanes can be prepared, as described in the aforementioned copending application, by reacting a chloro-chloroalkyl phosphate having an average of 0.5 to 2.5 chlorine atoms per molecule joined directly to a phosphorus atoms with a primary or secondary amine containing one or more functions which can react with an organic isocyanate at a temperature between 0° to 100° C. in the presence of an excess of an HCl acceptor, such as propylene oxide. In carrying out the reaction, the reactants are preferably combined in a ratio such that the number of amine molecules is substantially equal to the number of chlorine atoms contained in the chloro-chloroalkyl phosphate and joined directly to the phosphorus atom. The resulting phosphorus-containing polyol can be conveniently separated from the reaction mixture by, for example, distillation under vacuum.

The chloro-chloroalkyl phosphate described above in preparing the phosphorus-containing polyols can be prepared, as is described in the aforementioned copending application, by reacting phosphorus oxychloride and ethylene oxide and/or propylene oxide in the presence of a suitable catalyst such as pyridine or phosphorus trichloride in molar proportions of 0.5 to 2.5 moles of the alkylene oxide or oxides per mole of phosphorus oxychloride.

The concepts of the present invention reside in new and improved methods for preparing phosphorus-containing polyols for use in the manufacture of fire or flame-resistant polyurethanes.

In accordance with the practice of the present invention, phosphorus-containing polyols are prepared by reacting in aqueous medium a chloro-chloroalkyl phosphate containing an average of 0.5 to 2.5 chlorine atoms per molecule joined directed to a phosphorus atom with a primary or secondary amine containing one or more functions which can react with an organic isocyanate in the presence of a hydrogen chloride acceptor whose reaction product with HCl is soluble in water. It is generally preferred to make use of substantially equimolar quantities of the amine based upon the number of chlorine atoms joined directly to the phosphorus atom of the chloro-chloroalkyl phosphate. The resulting phosphorus-containing polyol in the organic phase can easily be separated from the aqueous phase by way of a number of conventional techniques.

The chloro-chloroalkyl phosphate used in accordance with the practice of the present invention can be prepared in the manner described above and in the aforementioned copending application. Thus, phosphorus oxychloride and an alkylene oxide, such as ethylene oxide, propylene oxide or a mixture of ethylene oxide are reacted at a temperature within the range of 0° to 100° C. in a molar ratio of 0.5 to 2.5 moles of alkylene oxide per mole of phosphorus oxychloride in the presence of a catalyst such as pyridine, phosphorus trichloride or titanium tetrachloride.

As the hydrogen chloride acceptor whose reaction product with HCl is soluble in water, use is preferably made of a material which is capable of reacting with HCl to prevent HCl from reacting with the chloro-chloroalkyl phosphate and which forms a product which is soluble in water. For this purpose, it is generally preferred to make use of a strong alkaline base, such as an alkali metal hydroxide (e.g., sodium hydroxide, potassium hydroxide, etc.), to form the corresponding chloride salt which is soluble in aqueous medium.

As the primary and secondary amines which are reacted with the chloro-chloroalkyl phosphate to form the phosphorus-containing polyols of the invention, use is made of a wide variety of amines which contain a function which is capable of reacting with organic isocyanates. The preferred primary and secondary amines are mono- and di-alkanol amines and the di-primary and di-secondary alkylene diamines. Representative of the foregoing are monoethanolamine, diethanol amine, propanol amine, dipropanol amine, iso-propanol amine, ethylene diamine, propylene diamine, diethylene diamine as well as many others.

One of the surprising aspects of the present invention is that while the chloro-chloroalkyl phosphate contains hydrolyzable chlorine atoms which are, consequently, capable of reacting with the water present in the reaction medium, it has been found that these hydrolyzable chlorine atoms react preferentially with the amine to thereby form the phosphorus-containing polyols in the invention. The separation of the resulting phosphorus-containing polyols from the reaction mixture is facilitated by virtue of the fact that the reaction product of the hydrogen chloride acceptor and HCl is an electrolyte, such as sodium chloride, which is soluble in the aqueous and thereby substantially reduces the solubility of the phosphorus-containing polyols in the aqueous phase.

In addition, various by-products of the reaction are soluble in aqueous media. Thus, the use of an aqueous reaction medium contributes significantly to the purity of the phosphorus-containing polyols since the by-products remain in the aqueous phase. The increased purity renders the phosphorus-containing polyols more suitable for use in the preparation of polyurethanes and the like, particularly in light of the fact that the water-soluble by-products are of an acid character. Particularly favorable results are achieved when the reaction is carried out in a total quantity of water corresponding to between the minimum quantity of water necessary to dissolve the reaction product of the hydrogen chloride acceptor and HCl and a quantity equal to 1.5 times this minimum quantity.

The reaction between the chloro-chloroalkyl phosphate with the amine is preferably carried out by introducing successive fractions of decreasing amounts of the chloro-chloroalkyl phosphate to the total quantity of the amine, which can be diluted with water. It is particularly advantageous to add a corresponding quantity of hydrogen chloride acceptor following each successive addition of the chloro-chloroalkyl phosphate.

For example, it is sometimes desirable in the practice of the present invention to introduce to the total quantity of amine to be reacted, one-half of the stoichiometric quantity of the chloro-chloroalkyl phosphate. It is believed that the HCl thereby liberated becomes fixed to the unreacted amine. Thus, next there is introduced to the reaction mixture a quantity of the HCl acceptor sufficient to displace the HCl fixed to the remaining amine. Thereafter, a second addition of the chloro-chloroalkyl phosphate is made in a quantity which is less than the preceding addition, followed by the addition of a corresponding quantity of HCl acceptor. This sequence can be continued, decreasing each addition of the chloro-chloroalkyl phosphate by, for example, halves. Finally, a last addition of either the chloro-chloroalkyl phosphate or the HCl acceptor is made, depending on whether an acidic final reaction mixture is desired.

During the additions to the reaction mixture as described above, the reaction mixture is preferably agitated while maintaining the reaction temperature within the desired range, preferably 0° to 100° C., and most preferably 30° to 50° C., by conventional techniques, such as by the use of a reaction vessel having a jacket for passage therethrough of a hot or cold heat transfer fluid. After the last introduction of reactants, no further agitation is effected, and the reaction mixture is allowed to stand, preferably after addition of water thereto to facilitate separation of the organic phase by, for example, decantation. The reaction mixture separates into two distinct phases, whereby the lighter aqueous phase containing the reaction product of the HCl acceptor and HCl dissolved therein can be separated. The dense organic phase containing the resulting phosphorus-containing polyol can be dried by vacuum distillation, and filtered to remove traces of any remaining HCl acceptor or its reaction products.

The phosphorus-containing polyols prepared in the manner described can be used in the manufacture of polyurethanes which are fire or flame resistant under the conditions described in the aforementioned copending application. The concepts of this invention make it possible to prepare rigid polyurethane foams which are self-extinguishing or non-flammable and which have good mechanical and insulating properties for use in, for example, the building industry.

In preparing polyurethanes, the phosphorus-containing polyols of the invention can be used alone or in combination with polyhydroxylated compounds which do not contain phosphorus for reaction with organic polyisocyanates. Representative polyhydroxylated compounds which do not contain phosphorus and can optionally be used include polyesters having at least two hydroxyl groups for molecule or polyethers having at least two hydroxyl groups, such as the condensation reaction products of propylene oxide and a polyol having a molecular weight in the range of 500 to 6,000.

The organic polyisocyanates currently employed in the manufacture of polyurethanes may equally be employed in the manufacture of the polyurethanes of this invention. For example, toluene diisocyanate, diphenylmethane diisocyanate and polymethylene polyphenylisocyanate (P A P I) are particularly suitable.

In the case of the manufacture of cellular polyurethanes, the various techniques known to those skilled in the art, such as the so-called quasi-prepolymer technique or the single stage technique may be used. Either water or a halogenated hydrocarbon, such as trichloromonofluoromethane, may be used as the foaming agent. It is generally advantageous to include a tension-active or surface active agent, such as a silicone oil and a catalyst which may be selected from the tertiary amines or compounds of tin.

The phosphorus-containing polyols according to the invention likewise may enter into the composition of premixtures containing, in addition to the phosphorus-containing polyols, the other ingredients which are necessary for the manufacture of polyurethanes, with the exception of polyisocyanates. These ingredients may be, for example, other polyol polyethers, catalysts, silicone oil and foaming agents.

These premixtures have a storage stability which is clearly greater than that of the premixtures manufactured from phosphorus-containing polyols heretofore prepared. They may be used subsequently in the manufacture of polyurethanes which are resistant to fire or flame.

Having described the basic concepts of the invention, reference is now made to the following examples which are provided by way of illustration, and not by way of limitation, of the practice of the invention.

EXAMPLE 1 a. Preparation of Phosphorus-containing Polyol

There is introduced into a reactor, which is provided with a stirring system and with a heating and cooling device, 3,758 parts by weight of phosphorus oxychloride and 12.2 parts by weight of titanium tetrachloride.

There are progressively added, under a pressure of 0.1 to 0.5 bars, 2,855 parts by weight of propylene oxide while the temperature of the reaction is maintained between 30° and 45° C. Thus, a condensate A is obtained.

Into a glass reactor which may be stirred, heated, or cooled, and which is resistant to vacuum, there is introduced a mixture of 440 parts by weight of diethanolamine and 500 parts by weight of water. Into this mixture there is successive placed with stirring, 539 parts of the condensate A while the temperature of the reaction is maintained at about 40° C. After about 2 minutes, there is progressively added to the reaction medium 76 parts by weight of NaOH in the form of an aqueous 50 percent solution. The temperature is still maintained at about 40° C. There are also introduced, successively:

269.5 parts of the condensate A
38.0 parts of the soda in solution
135.7 parts of the condensate A
19.0 parts of the soda in solution
67.8 parts of the condensate A
9.5 parts of soda in solution.

Then the reactive medium is allowed to stand for half an hour, and it separates into two phases. The lighter, aqueous phase is eliminated; the dense organic phase is dehydrated by distillation at 80° C. under an absolute pressure of 10–15 mm Hg. Then it is filtered.

Thus, there are obtained 960 parts of phosphorus-containing polyol whose characteristics are as follows:
Appearance: a clear liquid
Water content: 0.1 percent
Viscosity at 20 percent: 4969 Cst
pH(in methanolic solution): 7.25.

b. Preparation of a Rigid Polyurethane Foam

First, a premixture is made starting from:

| | Parts by wt. |
|---|---|
| Phosphorus-containing polyol prepared as in (a) | 25.0 |
| Polyether polyol, of hydroxyl index 420, obtained by condensation of propylene oxide on sorbitol | 75.0 |
| Dimethylethanolamine | 2.0 |
| Triethylenediamine | 0.5 |
| Silicon oil | 1.5 |
| Trichloromonofluoromethane | 33.0 |
| Dilaurate of dibutyl tin | 0.3 |

This premixture, which is very stable for long periods of time, is added with vigorous stirring to 105 parts by weight of polymethylene polyphenylisocyanate. As soon as the foam appears, the mixture is poured into an open mould.

A rigid foam is obtained, of a density of 33 kg/m³, non-flammable according to the norm ASTM D1,692–59T($t_1 = 60$ seconds; $t_2 = 0$; burnt length = zero).

EXAMPLE 2 a. Another portion of condensate A of Example 1 is used in the following manner.

Into a reactor which may be stirred, heated, or cooled, and which is resistant to vacuum, there is introduced 420 parts of diethanolamine. Then with stirring, 539 parts of the condensate A are progressively added while the temperature is maintained in the region of 40° C. Towards the end of the addition process, the viscosity of the mixture becomes somewhat high, but the medium remains stirrable. Two minutes later, there are progressively added 76 parts by weight of soda in the form of an aqueous 50 percent solution. The temperature is still maintained in the region of 40° C. Subsequently, and successively, there are introduced:

269.5 parts of the condensate A
38.0 parts of NaOH in solution
135.7 parts of the condensate A
19.0 parts of NaOH in solution
67.8 parts of the condensate A
9.5 parts of the NaOH in solution.

500 parts of water then are added to this mixture, and the entire resulting mixture is stirred for about 15 minutes. At the end of this time, stirring is stopped. After half an hour, the resulting mixture has separated into two phases. The lower phase is separated from the aqueous phase by decanting, before being dehydrated at 80° C under an absolute pressure of 15 mm Hg. After filtering, there are obtained 1,070 g. of a phosphorus-containing polyol which has the following characteristics:

Appearance: a clear liquid
Water content: 0.15 percent
Viscosity at 20° C: 5500 Cst
pH(in methanolic solution): 8.2.

b. Preparation of a rigid Polyurethane Foam

The following mixture is prepared:

|  | Parts by wt. |
|---|---|
| Phosphorus-containing polyol prepared as in (a) | 25.0 |
| Polyether polyol, of hydroxyl index 420, condensate of propylene oxide on sorbitol | 75.0 |
| Dimethylethanolamine | 1.0 |
| Triethylenediamine | 0.3 |
| Silicon oil | 1.5 |
| Trichloromonofluoromethane | 33.0 |
| Dilaurate of dibutyl tin | 0.2 |

This premixture is very stable for long periods of time, and is added with vigorous stirring to 100 parts by weight of polymethylene-polyphenyl-isocyanate. A foaming mixture is obtained which is poured into an open mold.

A rigid foam is obtained. Its density is of 33 kg/m³. It is, moreover, non-flammable in accordance with the norm ASTM D1,692–59T($t_1$ = 60 seconds; $t_2$ = 0; burnt length = zero).

It will be apparent from the foregoing that I have provided a new and improved phosphorus-containing polyol which can be prepared in a simple and efficient manner and which can be used in the preparation of polyurethanes which are resistant to fire or flame. The phosphorus-containing polyols of the present invention have greater purity than those heretofore prepared since acidic materials formed as a by-product during the reaction are soluble in aqueous medium, and hence are easily separated from the organic phase including the phosphorus-containing polyols.

It will be understood that various changes and modifications may be made in the details of procedure, formulation and use without departing from the spirit of the invention, especially as defined in the following claims.

I claim:

1. A method for preparing non-flammable polyurethanes comprising reacting a condensate of phosphorus oxychloride and a lower alkylene oxide with a primary or secondary amine having at least one function which is capable of reacting with an organic isocyanate in the presence of water and in the presence of an alkaline hydrogen chloride acceptor whose reaction product with hydrogen chloride is soluble in water, and separating and purifying the phosphorus-containing polyol from the aqueous phase, and then reacting the phosphorus-containing polyol with an organic polyisocyanate to produce a non-flammable polyurethane.

2. A method as defined in claim 1 wherein the condensate is prepared by reacting phosphorus oxychloride with an alkylene oxide at a temperature of 0° to 100° C. in a mole ratio of 0.5 to 2.5 moles of alkylene oxide per mole of phosphorus oxychloride.

3. A method as defined in claim 2 wherein the alkylene oxide is selected from the group consisting of ethylene oxide, propylene oxide and mixtures thereof.

4. A method as defined in claim 1 wherein the condensate and the amine are reacted in a ratio of about 1 mole of amine per chlorine atom joined directly to a phosphorus atom in the condensate.

5. A method as defined in claim 1 wherein the hydrogen chloride acceptor is an alkaline base.

6. A method as defined in claim 1 wherein the hydrogen chloride acceptor is an alkali metal hydroxide.

7. A method as defined in claim 1 wherein the amine is selected from the group consisting of mono- and di-alkanol amines and primary and secondary alkylene diamines.

8. A method as defined in claim 1 wherein the reaction mixture contains an amount of water ranging up to 1.5 times the quantity of water necessary to dissolve the reaction product of the hydrogen chloride acceptor and HCl.

9. A method as defined in claim 1 wherein the condensate is added to the reaction mixture in two or more successive increments.

10. A method as defined in claim 9 wherein each increment of the condensate is followed by the addition of a corresponding amount of the hydrogen chloride acceptor.

11. A method as defined in claim 9 wherein each successive increment of the condensate contains a decreasing amount of the condensate.

12. A method as defined in claim 1 wherein the reaction of the phosphorus-containing polyol with the isocyanate is carried out in the presence of a polyhydroxylated compound which does not contain phosphorus.

13. A method as defined in claim 1 wherein the reaction of the phosphorus-containing polyol with the isocyanate is carried out in the presence of a foaming agent selected from the group consisting of water and a halogenated hydrocarbon.

14. A method as defined in claim 1 wherein the reaction of the phosphorus-containing polyol with the isocyanate is carried out in the presence of a surface active agent.

15. A method as defined in claim 1 wherein the reaction of the phosphorus-containing polyol with the isocyanate is carried out in the presence of a catalyst selected from the group consisting of a tertiary amine and an organo tin compound.

16. A polyurethane prepared by the method of claim 1.

* * * * *